US006912555B2

(12) United States Patent
Lemon et al.

(10) Patent No.: US 6,912,555 B2
(45) Date of Patent: Jun. 28, 2005

(54) METHOD FOR CONTENT MINING OF SEMI-STRUCTURED DOCUMENTS

(75) Inventors: Michael J. Lemon, Palo Alto, CA (US); Maria Castellanos, Sunnyvale, CA (US); James R. Stinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/053,987

(22) Filed: Jan. 18, 2002

(65) Prior Publication Data

US 2003/0140311 A1 Jul. 24, 2003

(51) Int. Cl.⁷ .............................................. G06F 15/16
(52) U.S. Cl. ..................................... 707/513; 709/202
(58) Field of Search .......................... 709/202; 707/100, 707/500, 513

(56) References Cited

U.S. PATENT DOCUMENTS

| | | | | |
|---|---|---|---|---|
| 6,470,352 B2 * | 10/2002 | Yaginuma | .................. | 707/102 |
| 6,473,741 B1 * | 10/2002 | Baker | .......................... | 705/31 |
| 6,477,538 B2 * | 11/2002 | Yaginuma et al. | .......... | 707/102 |
| 6,477,565 B1 * | 11/2002 | Daswani et al. | ............ | 709/217 |
| 6,640,244 B1 * | 10/2003 | Bowman-Amuah | ......... | 709/207 |
| 6,640,249 B1 * | 10/2003 | Bowman-Amuah | ......... | 709/228 |
| 6,711,585 B1 * | 3/2004 | Copperman et al. | ..... | 707/104.1 |
| 6,718,338 B2 * | 4/2004 | Vishnubhotla | .............. | 707/102 |
| 6,721,795 B1 * | 4/2004 | Eldreth | ....................... | 709/232 |
| 6,745,185 B2 * | 6/2004 | Lee et al. | ...................... | 707/6 |
| 6,775,671 B1 * | 8/2004 | de Lara et al. | ............... | 707/10 |
| 6,836,773 B2 * | 12/2004 | Tamayo et al. | ................ | 707/6 |
| 6,865,582 B2 * | 3/2005 | Obradovic et al. | ...... | 707/104.1 |

* cited by examiner

*Primary Examiner*—David Y. Eng (57) ABSTRACT

Embodiments of the present invention are directed to a method for content mining of semi-structured documents. In one embodiment, a semi-structured document is first converted from a document-type specific format such as HTML or PDF, to a document-type independent format such as XML. The document formatting, which contains basic level information about the document's structure, is then analyzed by a series of modules to develop a higher level understanding of the document's structure. These modules append information to the document describing the features which collectively comprise the higher level document structure. The appended information facilitates finding specified information within the document when content mining is performed.

21 Claims, 6 Drawing Sheets

```
<row label="voltage">
    <column label="minimum" value="3" />
    <column label="maximum" value="7" />
    <column label="test conditions" value="test A" />
     .
     .
     .
</row>
```

METHOD FOR CONTENT MINING OF SEMI-STRUCTURED DOCUMENTS

TECHNICAL FIELD

Embodiments of the present invention relate to the field of data management systems. More particularly, embodiments of the present invention pertain to a method for content mining of semi-structured documents.

BACKGROUND ART

Given the rapid growth of public information sources on the World Wide Web, it has become increasingly attractive to extract data from these sources and make it available for further processing by end users and application programs. Data extracted from Web sites can serve a variety of tasks, including information retrieval for business intelligence, event monitoring (e.g., news and stock market monitoring), and electronic commerce (e.g., shopping comparisons). For example, a company may extract performance specifications from the corporate Web sites of purveyors in order to choose components for its products.

Extracting semi-structured data from Web sites is not a simple task. Most of the information on the Web today is in the form of Hypertext Markup Language (HTML) or Portable Document Format (PDF) documents which are displayed by a browser or viewer. Given that the format of HTML documents is designed for presentation purposes, not automated extraction, and the fact that some of the HTML content on the Web is ill-formed due to incorrect coding, extracting data from such documents can be very difficult. While not malformed, PDF documents contain low-level coordinate information that is suitable for display but that makes automated extraction even more difficult. For example, trying to identify a table of data based upon its coding can be difficult in that while the browser may display data that lines up in rows and columns, there is nothing in the coding to indicate a table exists. This complicates table identification in that there is not an exact correlation between what is displayed by the Web browser and the coding which generated the display.

The most common way of extracting information from the Web is by generating a wrapper program. A wrapper program is usually handwritten code for extracting information from a specific document type. In other words, one type of wrapper program is written for HTML documents while another type is needed for PDF documents etc. Hand crafting of wrappers has many disadvantages such as being tedious, time consuming, and requiring extensive resources in order to maintain the wrapper once it has been created.

Wrapper programs are usually written with a priori knowledge of the structure of the Web page and the location of the data being extracted from the Web page. Some wrapper languages require the use of absolute HTML paths that point to the data item to be extracted. An absolute path describes the navigation down an HTML tree, starting from the top of the tree (<HTML> tag) and proceeding towards child nodes that contain the data to be extracted. The path is made absolute by the fact that it specifically delineates a specific path to the data by listing tag names expected to be seen in the tree and their positions. For instance, an absolute path to the third table, first row, and second column in an HTML document could be expressed as:

/HTML/BODY/TABLE[3]/TR[1]/TD[2].

However, the absolute path approach is likely to fail when the target HTML page changes. The most common change performed during Web site maintenance is changing the positioning of items on the page. New content (e.g. advertising) is frequently added to a page or existing content is moved to a new location on the page. This changes the absolute location of tags and renders useless the absolute HTML path which has been established. For this reason, it is important to establish the location of data items independently of their absolute paths. However, a wrapper program written with absolute paths no longer contains the formatting information of the document, which makes this impossible. This means it is necessary to constantly update the wrapper's absolute path for a particular Web site each time a change is made in the target Web page, a process which is both costly and time consuming.

A number of different approaches have been attempted to work around some of these problems. Gupta et. al. (5,826, 258) attempted to organize disparate semistructured resources by providing a wrapper to extract information and provide structured information to a mapper coupled to a standard relational database engine. The occurrences of patterns in the semistructured information are cataloged by name and position in a nested structure. While this approach did not utilize a priori information, it still generated a wrapper program to access the attributes in the semistructured information as tuples for a relational database.

In a paper titled, "Learning Information Extraction Rules for Semi-structured and Free Text," (University of Washington), an information extraction system is described which utilizes training sets to teach an information extractor what information is to be extracted. Examples are provided, both of "good" information to be extracted and "bad" information which should not be extracted to create the training set. The information extractor develops patterns based upon these examples and applies the patterns to new documents. This has the disadvantage of requiring the building of a training set which is time consuming and inflexible when encountering data which falls outside the spectrum of the training set.

Another approach described in a paper titled, "Conceptual-model-based Data Extraction from Multiple-record Web Pages," (Brigham Young University), uses HTML tags in detecting record boundaries or sections. The HTML markups are then discarded in the actual data extraction phase. Unfortunately, this data extraction scheme focuses on unstructured documents that are data rich, but narrow in ontological breadth. In other words the data extraction works upon documents within a narrowly defined domain only. As described in the paper, the method was developed for extracting information from obituary articles. Obviously, this is of little value for most needs where the scope of information being extracted is not so narrowly defined.

DISCLOSURE OF THE INVENTION

Embodiments of the present invention are directed to a method for content mining of semi-structured documents. In one embodiment, a semi-structured document is first converted from a document-type specific format to a document-type independent format. The document formatting, which contains basic level information about the document's structure, is then analyzed by a series of modules to develop a higher level understanding of the document's structure. These modules append information to the document describing the features which collectively comprise the higher level document structure. The appended information facilitates finding information within the document when content mining is performed without requiring a specific path to that information.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

MODES FOR CARRYING OUT THE INVENTION

Reference will now be made in detail to the preferred embodiments of the present invention, examples of which are illustrated in the accompanying drawings. While the present invention, a method for content mining of semi-structured documents, will be described in conjunction with the preferred embodiments, it will be understood that they are not intended to limit the present invention to these embodiments. On the contrary, the present invention is intended to cover alternatives, modifications, and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Portions of the present invention are comprised of computer-readable and computer-executable instructions that reside, for example, in computer system comprising, for example, a central processor, memory, data storage, a bus coupling these components together, and various devices for inputting and outputting of data and information. It is appreciated that the present invention can operate within a number of different computer systems including general-purpose computer systems, embedded computer systems, laptop computer systems, hand-held computer systems, and stand-alone computer systems.

Figure 1:
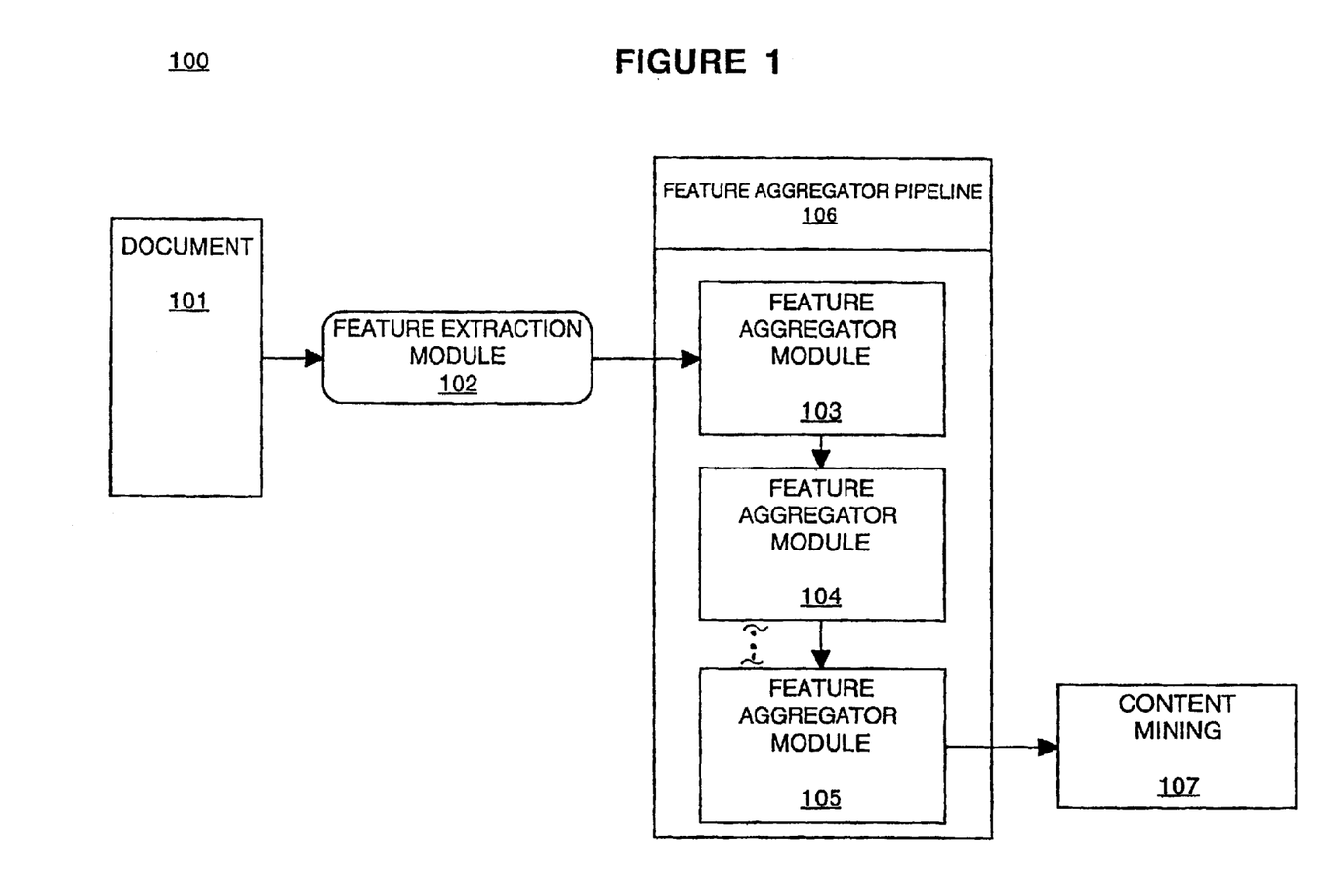
FIG. 1 shows the different modules used for content mining of semi-structured documents in accordance with embodiments of the present invention.

The present invention is a method for content mining of semi-structured documents. Referring to FIG. 1, a document 101 is received in a document-type specific format and goes through a "feature extraction" module 102 which converts the document to a document-type independent format. The features of the document are then analyzed by a series of separate "feature aggregator" modules 103-105 in what is referred to as a "feature aggregator pipeline" 106. Each module analyzes a specific feature of the document's formatting information to successively develop a higher level concept of how data is organized within the document. This higher level concept of the data structure facilitates identifying important sections of data within the document which can be mined for specific information. Rules are then applied on the higher level document structure to mine 107 specific information from the document. Because of the modular nature of the present invention, it is easily configured and new document formats can be easily integrated as they become available. Furthermore, the present invention does not rely upon a priori knowledge of the document's structure which eliminates the need for constant modification to accommodate Web site changes.

Figure 2:
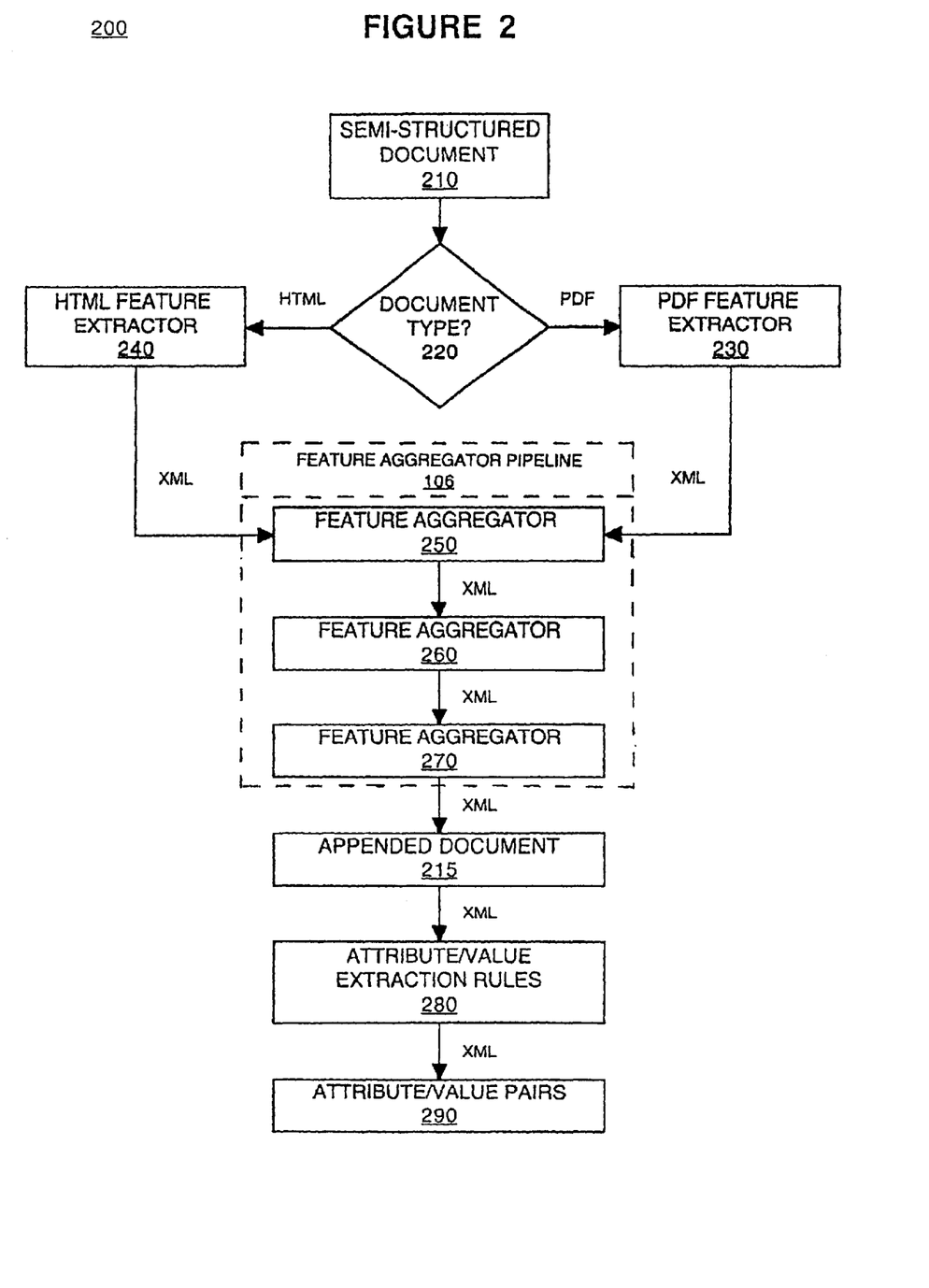
FIG. 2 is a block diagram showing components used in a method for content mining of semi-structured documents in accordance with embodiments of the present invention.
Figure 3:
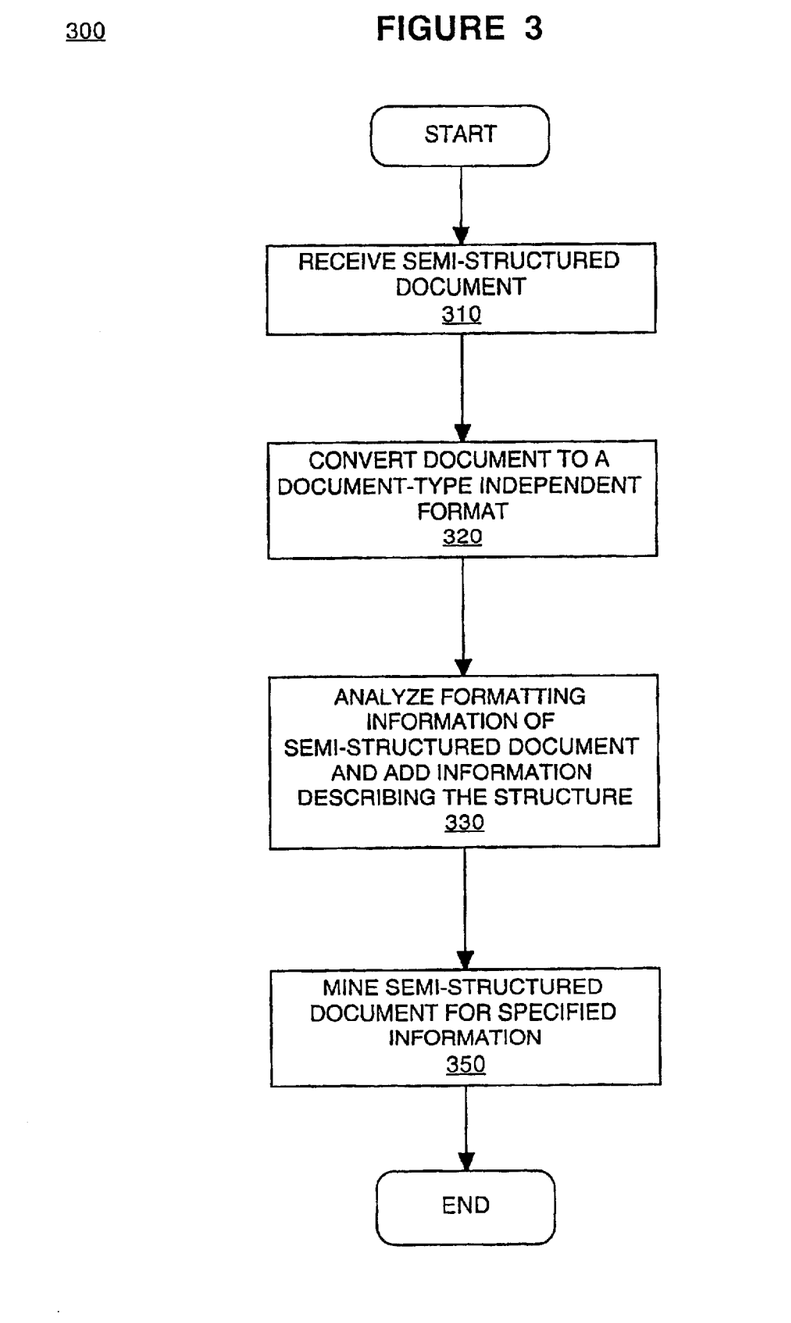
FIG. 3 is a flowchart of a method for content mining of semi-structured documents in accordance with embodiments of the present invention.

FIG. 2 is a block diagram showing components used in a method for content mining of semi-structured documents in accordance with embodiments of the present invention as set forth in flow chart 300 of FIG. 3. For purposes of clarity, the following discussion will utilize FIG. 2 in conjunction with flow chart 300 of FIG. 3, to clearly describe one embodiment of the present invention.

With reference to FIG. 2 and to step 310 of FIG. 3, a semi-structured document is received. In one embodiment, semi-structured document 210 is a Web document downloaded from an Internet site. However, the present invention is not limited to documents coming from that particular information source. The document is likely to be in a Hyper-Text Markup Language (HTML), Portable Document Format (PDF), or some other standard document format at this point. While these formats are specifically recited in the present embodiment, the present invention can be adapted to work with other document formats as well. For example, as other document formats become commonly accepted for Web documents, other feature extraction modules can be added to the present invention to accommodate them. Thus, the present invention provides the flexibility and extensibility to be used across a wide variety of document formats.

A semi-structured document contains information that has more structural features than simple free text. Structured information can be presented in tables, lists, sections, bullet lists, numbered sections, multi-level structures, etc. An example of a semi-structured document is a company's product Web page which could include section headings, text sections containing product descriptions, and tables of performance specifications for the various products.

With reference to FIG. 2 and to step 320 of FIG. 3, the semi-structured document is converted to a document-type independent format. In the present invention, a logic operation 220 takes place to determine the document type and direct document 210 to the proper feature extractor. Document 210 is then sent to a feature extractor specific to its document type. For example, if document 210 is an HTML document, it is sent to HTML feature extractor 240, if document 210 is a PDF document, it is sent to PDF feature extractor 230. The present invention can also incorporate additional feature extractors for new document formats as they are developed. The feature extractor then converts document 210, including its formatting information, from a document-type specific format (e.g., HTML, PDF, etc.) to a document-type independent format. Thus, separate versions of the present invention are not required for different document formats. Additionally, as new document formats are implemented, they can easily be incorporated into the present invention by adding a feature extraction module specific to the new document format.

In one embodiment, the document-type independent format is the Extensible Markup Language (XML). XML is frequently used to present structured data such as a database in a text format. Like HTML, XML makes use of tags and attributes. However, while HTML specifies what each tag and attribute means, XML uses the tags only to delimit pieces of data and leaves the interpretation of the data up to the application that reads it. In the present invention, XML tags which describe features of the document structure are appended to the document as it is analyzed by a series of feature aggregators. Collectively, the XML tags will provide a higher level of understanding about the document structure than can be derived from the formatting information alone and facilitate mining the document later for specific information.

With reference to FIG. 2 and to step 330 of FIG. 3, the formatting information of the semi-structured document is analyzed. Document 210 is annotated with features, output from one of the feature extractors (e.g., feature extractors 230 or 240 of FIG. 2) in XML format and is passed to the first module in the feature aggregator pipeline (e.g., feature aggregator 250 of FIG. 2).

When a document is sent across the World Wide Web, it is sent as text along with associated formatting information. A Web browser or PDF reader on a user's computer interprets the formatting instructions in order to display the text to a user as the Web page creator intended the page to appear. These low level formatting instructions such as font type style and size, as well as any colors, tables, or bulleted lists used in the document are important as they characterize, at the most basic level, the structure of the document. These formatting instructions are analyzed by the present invention to develop a higher level understanding of the document structure in order to mine the desired information from the document.

An analogy to this is in the field of cursive handwriting recognition. When a user writes a sentence the program initially records the writing as a series of X-Y coordinates. These coordinates are later connected to form strokes which are connected to become letters and ultimately words and sentences. The X-Y coordinates are the most basic level structures, which are built upon to create higher level structures such as letters, words, and sentences. In the present invention, the formatting instructions are the most basic level structures which are analyzed and developed until a higher level understanding of the document structure emerges.

Figure 4:
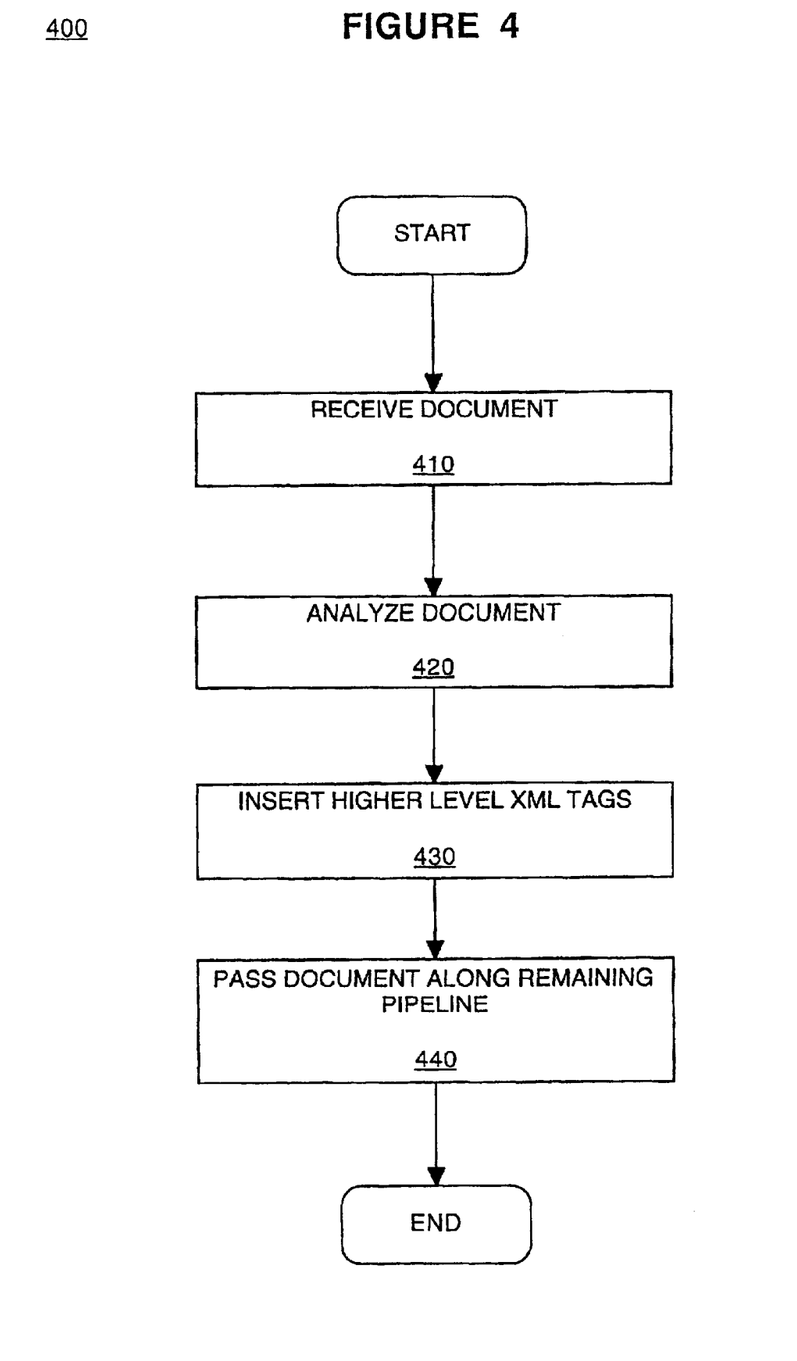
FIG. 4 is a flow chart of the steps performed by a feature aggregator in accordance with embodiments of the present invention.

With reference to FIG. 4, and to step 330 of FIG. 3, information is automatically added to the document describing its structure after analyzing the formatting information. Each feature aggregator is a separate module which receives a document (step 410 of FIG. 4), analyzes a particular kind of feature of the document's formatting (step 420 of FIG. 4) and adds information about that particular point of analysis to the document. The feature aggregator inserts higher level XML tags into the document (step 430 of FIG. 4) containing the information derived from the feature analysis and passes the document further down the feature aggregator pipeline (step 440 of FIG. 4). For example, a feature aggregator which analyzes font size would add XML tags to document 210 describing the various font sizes used throughout the document. As each aggregator module in the pipeline analyzes a particular feature of document 210, more XML tags are appended to it to further develop a higher level understanding of the document structure. At the end of the feature analysis pipeline, a fuller understanding of the document's structure is developed that was not possible when simply looking at the document's formatting information. Ultimately, enough knowledge of the document's structure is contained in the appended higher level XML tags that a particular piece of information can be retrieved from the document by searching the tags when content mining is performed.

A particular feature aggregator can ignore previously appended tags if they are irrelevant to the analysis to be performed. Alternatively, a feature aggregator can utilize the information provided by previously appended tags in order to derive feature attributes which are not specified in the document formatting. An analogy to this concept is to have one module (e.g., feature aggregator 250 of FIG. 2) which describes rows of data, a second module (e.g., feature aggregator 260 of FIG. 2) which describes columns of data, and a third module (e.g., feature aggregator 270 of FIG. 2) which, using the information provided by the previous two modules derives the concept of a table of data. Because feature aggregator modules can ignore XML tags that they do not understand or require to perform their analysis, they can be added or subtracted to the pipeline as needed without adversely affecting the performance of the present invention. Also, there is no specified limit to the number of feature aggregator modules which can be in the pipeline. However, it should be noted that the order of the aggregators in the pipeline may be important due to the fact that one aggregator may depend on the output of another aggregator.

There are numerous document features which may be analyzed by the present invention. While the present embodiment recites specific feature aggregator modules for exemplary purposes, it is not intended to limit the present invention to these modules alone. Other examples of document features which can be analyzed by feature aggregators include the writing style of the document, the reading level of the document, or the frequency of word usage within the document.

The serial sequence of the feature aggregators avoids the problems associated with merging partial results from feature aggregators operating in parallel. Furthermore, it allows the present invention to operate on a string of documents so that one document can be processed by a feature aggregator (e.g., feature aggregator 270 of FIG. 2) while another document is being processed by another feature aggregator (e.g., feature aggregator 250).

Figure 5:
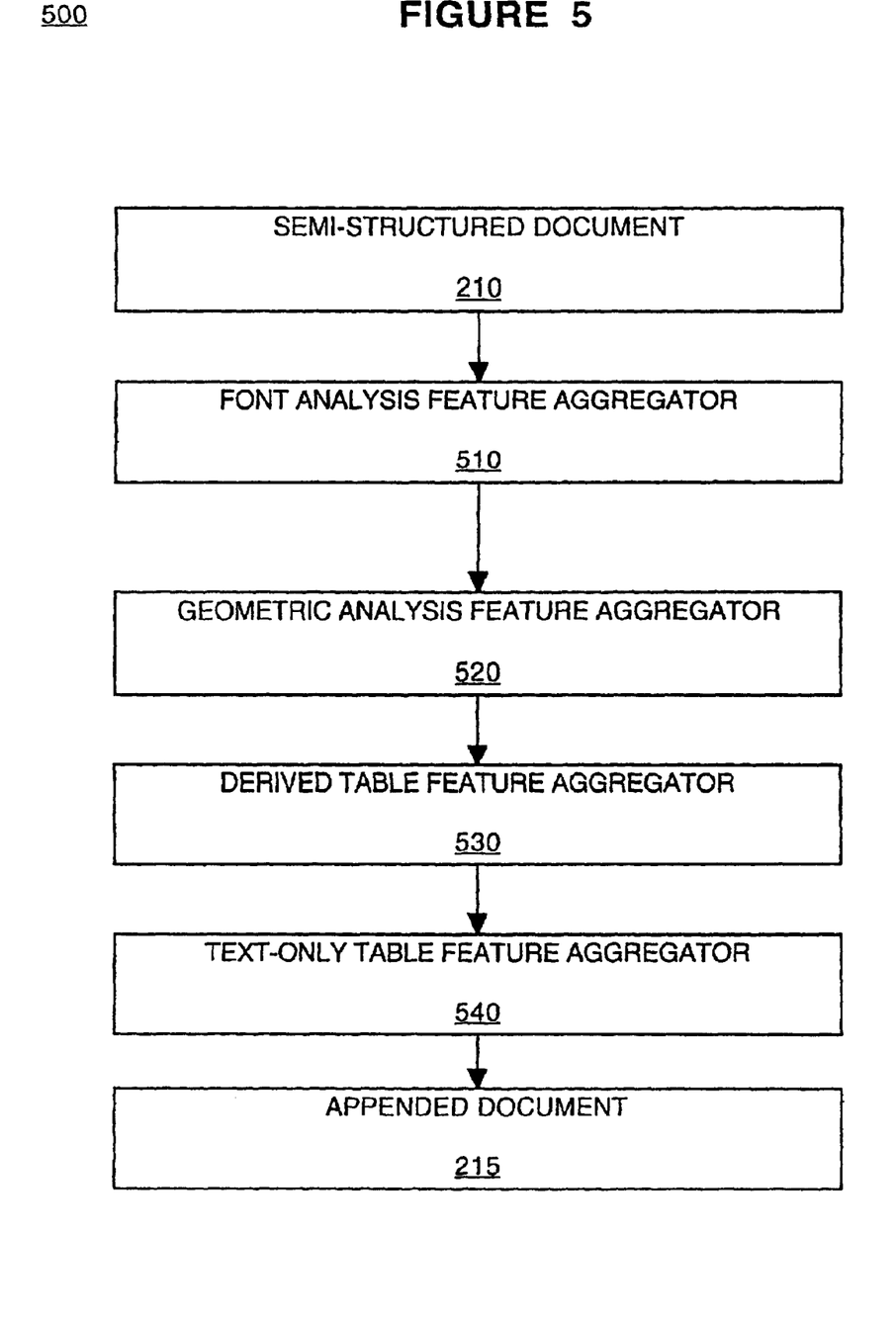
FIG. 5 shows a document being processed by feature aggregators in accordance with embodiments of the present invention.

Referring to FIG. 5 as an example of how the feature aggregators use the XML tags, one feature aggregator (e.g., feature aggregator 510 of FIG. 5) in the pipeline can perform a font analysis of the document. The font analysis can utilize formatting information such as font type (e.g., Arial, Times Roman, Courier, etc.), font size, font style (e.g., regular, bold, italic, or underlined font), to identify different features of the document. This information can be used, for example, to identify section headings which probably will have a larger font size than the text section that follows it. The font analysis can also be used to identify sections of the document that are likely to have the same format throughout the document. For example, text portions of a document will usually have the same formatting throughout the document while a table of data may have different formatting characteristics. The font analysis feature aggregator adds XML tags to the document which describe these particular features of the document.

Another feature aggregator (e.g., feature aggregator 520 of FIG. 5) can perform geometric analysis on the document based on x,y coordinate information for the text in the document (e.g., a PDF document). The layout of the lines and characters in the document can provide important information about the document structure. A geometric analysis feature aggregator can be used to derive spacing information in order to identify columns and rows of data and add higher level XML tags to the document which describe these features. Since the geometric analysis feature aggregator does not rely upon font analysis information, it can ignore those XML tags that were inserted by the font analysis feature aggregator.

Figure 6:
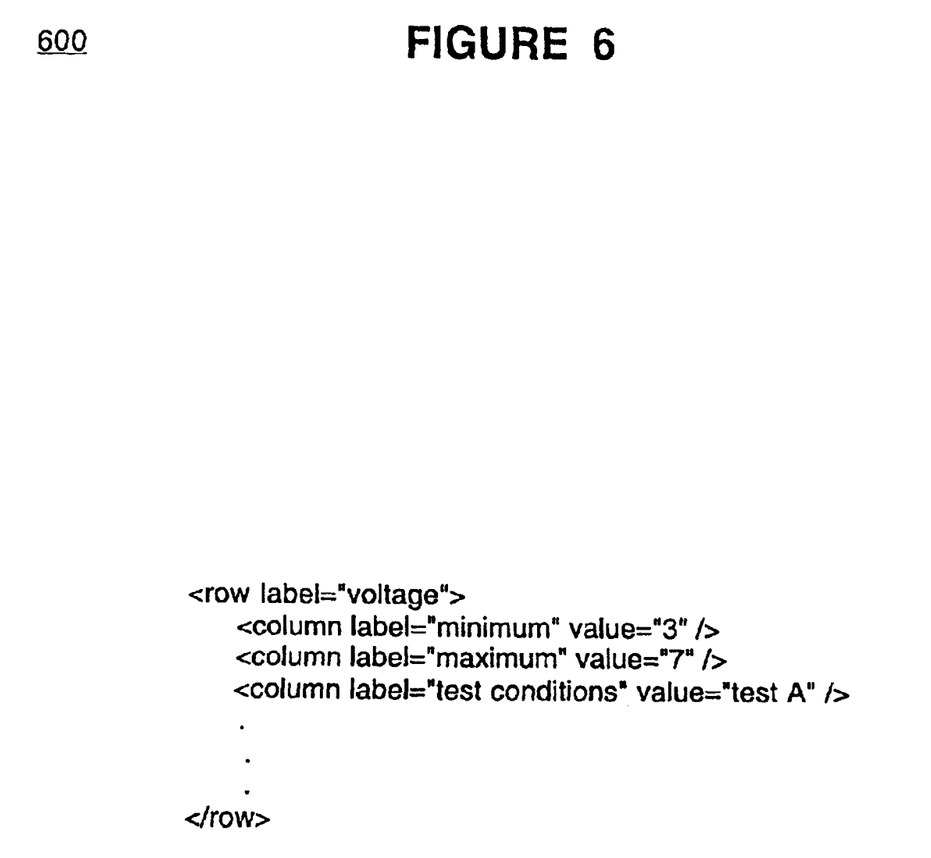
FIG. 6 shows an exemplary XML tag for describing data in accordance with embodiments of the present invention.

Another third feature aggregator (e.g., feature aggregator 530 of FIG. 5) can then derive the concept of a table of data based upon the higher level XML tags appended to document 210 by feature aggregators 510 and 520. For example, a different size of font or the use of bold font may indicate the headings for rows and columns in the tables while the spacing information provided by geometric analysis is used to identify word clusters and to determine the vertical and horizontal alignment of word clusters in the table. A table identification feature extractor can analyze the XML tags from feature aggregators 510 and 520 and append tags to document 210 which, for example, identify the rows and columns of the table, and the information contained in them. An exemplary tag 600 for a row in a table showing voltage values is shown in FIG. 6. As shown in FIG. 6, the appended tag 600 contains information which can be used to reconstruct a row of data in a table. A separate tag for each row in the table is appended to document 210 in order to provide a thorough description of the structure of the table.

Another feature aggregator (e.g., feature aggregator 540 of FIG. 5) could be used to describe information contained in tables within the document based on text alone. Features used to identify these tables include such things as the number of word clusters on a line of text, the vertical alignment of word clusters on separate lines of text, changes in text density or space density between lines of text, the presence of heading lines, and multiple consecutive lines of text with these characteristics. Again, higher level XML tags are appended to the document which describe the structure of the table.

Referring again to FIG. 2, when document 210 passes through the feature aggregator pipeline, it emerges as appended document 215 which is now ready for content mining. Appended document 215 now comprises the original semi-structured document in XML format and the inserted higher level XML tags, describing document features, which were added by the feature aggregators in the pipeline. The XML tags collectively describe higher level document structures such as tables and lists which have been derived from the document's formatting information. The XML tags are used when content mining is performed on the document to facilitate locating the specific information being sought.

With reference to FIG. 2 and to step 350 of FIG. 3, the semi-structured document is mined for specified information. A set of attribute/value extraction rules 280 defines the parameters of the information being sought. In one embodiment, the extraction rules are hand-coded. However, the rules can also be generated by other methods such as, for example, providing examples of information to be retrieved from documents and automatically generating a rule based upon those examples. Important concepts in the rule correspond to features of appended document 215 which are described in the inserted higher level XML tags. Attribute/value pairs 290 are the result of the application of the rules.

In one embodiment, the present invention is used to mine downloaded Web pages for performance specifications of components. This information is typically contained in a table within the document. If a user is, for example, seeking voltage specifications for a component, an exemplary query might be phrased:

"Get the maximum voltage and the associated test conditions". For this query, the present invention applies th corresponding rules and conducts a five-step search of the XML tags with the following parameters:

1. Go to the row whose label="voltage".
2. Go to the column whose label="maximum".
3. Get that value and call it "voltage.max".
4. Go to the column whose label="test conditions".
5. Get that value and call it "voltage.testconditions".

The present invention searches the information held within the appended XML tags of document 215 to find data fields which correspond to the attribute/value extraction rules provided by the user. Specifically, higher level concepts such as "row," "voltage," "maximum," and "test conditions", are searched in the inserted XML tags of appended document 215 to retrieve the information the user is seeking. A name for the return value is provided which identifies the attributes of the information being returned to the user performing the query. Referring again to FIG. 6, the present invention could search all row names until it finds the XML tag:

<row label="voltage">

Once the row labeled "voltage" is found, the columns of the row are traversed until the column labeled "maximum" is found, the value of 7 is retrieved along with the name of the associated attributes (e.g., voltage.max). The row is traversed again until the column labeled "test conditions" is found, and the value of "test A" is retrieved with the associated attributes (e.g., voltage.testconditions). These results are then returned to the user in XML format:

```

    <result attribute="voltage.max" value="7" />
    <result attribute="voltage.testconditions" value="test A" />

```

Because the present invention does not rely upon a designated path to find information, it is not affected by changes to the structure of a Web page such as moving the location of a particular piece of information. Additionally, as the feature aggregators are able to append information to the document about derived features which are not specifically defined in the document's formatting, the present invention is better suited to finding information which might not be found by prior art extraction techniques.

The preferred embodiment of the present invention, a method for content mining of semi-structured documents, is thus described. The present invention provides a configurable, extensible system which is compatible with a wide variety of document formats. Because the present invention does not rely upon a priori knowledge of the document structure, it makes content mining of documents easier than the prior art methods and does not require changes to its structure to account for changes to a specific Web site. While the present invention has been described in particular embodiments, it should be appreciated that the present invention should not be construed as limited by such embodiments, but rather construed according to the following claims.

What is claimed is:

1. A method for content mining of semi-structured documents comprising:
   receiving a semi-structured document;
   converting said semi-structured document to a document-type independent format;
   analyzing formatting information of said semi-structured document;
   adding information to said semi-structured document describing said semi-structured document's structure, based upon said analyzing; and mining said semi-structured document for specified information, wherein said added information facilitates said content mining.

2. The method for content mining of semi-structured documents as recited in claim 1, wherein said converting further comprises:
receiving said semi-structured document in a document-type dependent format; and
outputting said semi-structured document in a document-type independent format.

3. The method for content mining of semi-structured documents as recited in claim 2, wherein said document-type independent format is the Extensible Markup Language (XML) format.

4. The method for content mining of semi-structured documents as recited in claim 3, wherein said added information comprises an XML tag describing a feature of said semi-structured document's structure.

5. The method for content mining of semi-structured documents as recited in claim 4, wherein said analyzing further comprises utilizing a plurality of said XML tags to derive said semi-structured document's structure.

6. The method for content mining of semi-structured documents as recited in claim 5, wherein said mining comprises:
performing a query, wherein an extraction rule is provided defining a plurality of attributes of said specified information;
finding an XML tag which corresponds to at least one of said plurality of attributes; and
retrieving a value contained within said XML tag which corresponds to at least one of said plurality of attributes.

7. The method for content mining of semi-structured documents as recited in claim 6 wherein said specified information comprises a plurality of said retrieved values.

8. A computer system comprising:
a bus;
a memory unit coupled to said bus; and
a processor coupled to said bus, said processor for executing a method for content mining of semi-structured documents, said method comprising:
receiving a semi-structured document;
converting said semi-structured document to a document-type independent format;
analyzing formatting information of said semi-structured document;
adding information to said semi-structured document describing said semi-structured document's structure, based upon said analyzing; and
mining said semi-structured document for specified information, wherein said added information facilitates said content mining.

9. The computer system as recited in claim 8, wherein said converting further comprises:
receiving said semi-structured document in a document-type dependent format; and
outputting said semi-structured document in a document-type independent format.

10. The computer system as recited in claim 9, wherein said document-type independent format is the Extensible Markup Language (XML) format.

11. The computer system as recited in claim 10, wherein said added information comprises an XML tag describing a feature of said semi-structured document's structure.

12. The computer system as recited in claim 11, wherein said analyzing further comprises utilizing a plurality of said XML tags to derive said semi-structured document's structure.

13. The computer system as recited in claim 12, wherein said mining comprises;
performing a query, wherein an extraction rule is provided defining a plurality of attributes of said specified information;
finding an XML tag which corresponds to at least one of said plurality of attributes; and
retrieving a value contained within said XML tag which corresponds to at least one of said attributes.

14. The computer system as recited in claim 13 wherein said specified information comprises a plurality of said retrieved values.

15. A computer-usable medium having computer-readable program code embodied therein for causing a computer system to perform a method for content mining of semi-structured documents comprising:
receiving a semi-structured document;
converting said semi-structured document to a document-type independent format;
analyzing formatting information of said semi-structured document;
adding information to said semi-structured document describing said semi-structured document's structure, based upon said analyzing; and
mining said semi-structured document for specified information, wherein said added information facilitates said content mining.

16. The computer-usable medium as recited in claim 15, wherein said converting further comprises:
receiving said semi-structured document in a document-type dependent format; and
outputting said semi-structured document in a document-type independent format.

17. The computer-usable medium as recited in claim 16, wherein said document-type independent format is the Extensible Markup Language (XML) format.

18. The computer-usable medium as recited in claim 17, wherein said added information comprises an XML tag describing a feature of said semi-structured document's structure.

19. The computer-usable medium as recited in claim 18, wherein said analyzing further comprises utilizing a plurality of said XML tags to derive said semi-structured document's structure.

20. The computer-usable medium as recited in claim 19, wherein said mining comprises;
performing a query, wherein an extraction rule is provided defining a plurality of attributes of said specified information;
finding an XML tag which corresponds to at least one of said plurality of attributes; and
retrieving a value contained within said XML tag which corresponds to at least one of said attributes.

21. The computer-usable medium as recited in claim 20 wherein said specified information comprises a plurality of said retrieved values.

* * * * *